US012748259B2

(12) United States Patent
Chen et al.

(10) Patent No.: US 12,748,259 B2
(45) Date of Patent: Sep. 29, 2026

(54) OPTICAL-ELECTRONIC PRINTED CIRCUIT BOARD, PARAMETER DETERMINATION METHOD, ELECTRONIC DEVICE, AND STORAGE MEDIUM

(71) Applicant: ZTE CORPORATION, Shenzhen (CN)

(72) Inventors: Xiaolin Chen, Shenzhen (CN); Hao Tian, Shenzhen (CN); Yonghui Ren, Shenzhen (CN); Bi Yi, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 717 days.

(21) Appl. No.: 18/033,891

(22) PCT Filed: Oct. 27, 2021

(86) PCT No.: PCT/CN2021/126632
§ 371 (c)(1),
(2) Date: Apr. 26, 2023

(87) PCT Pub. No.: WO2022/089470
PCT Pub. Date: May 5, 2022

(65) Prior Publication Data

US 2023/0400635 A1 Dec. 14, 2023

(30) Foreign Application Priority Data

Oct. 27, 2020 (CN) ........................ 202011160739.0

(51) Int. Cl.
*G02B 6/125* (2006.01)
*G01M 11/00* (2006.01)

(52) U.S. Cl.
CPC ............ *G02B 6/125* (2013.01); *G01M 11/33* (2013.01)

(58) Field of Classification Search
CPC .... G02B 6/125; G02B 27/0012; G02B 6/122; G01M 11/33; H01S 5/20; H05K 1/0274
See application file for complete search history.

(56) References Cited

U.S. PATENT DOCUMENTS 11,609,379 B2 * 3/2023 Liu ........................ G02B 6/126
2007/0230528 A1 10/2007 Miyajima et al.
(Continued)

FOREIGN PATENT DOCUMENTS

JP 2005070573 A 3/2005
JP 2006013075 A 1/2006
(Continued)

OTHER PUBLICATIONS

WIPO, International Search Report issued on Jan. 27, 2022.
(Continued)

*Primary Examiner* — John Bedtelyon
(74) *Attorney, Agent, or Firm* — Li & Cai Intellectual Property (USA) Office

(57) ABSTRACT

Provided are a method for determining parameters of a waveguide core in an optical-electronic printed circuit board, an optical-electronic printed circuit board, an electronic device, and a storage medium. The method includes: determining, according to a refractive index of a material from which the waveguide core is made and a refractive index of a material from which a base layer is made, a critical angle of total reflection at an interface between the waveguide core and the base layer; and determining the parameters of the waveguide core according to a relative positional relationship between one end port of the waveguide core and the other end port of the waveguide core in the optical-electronic printed circuit board, a condition of a region through which the waveguide core passes, and the critical angle, so that steering of the waveguide core is
(Continued)

achieved without introducing a curved surface to the waveguide core.

20 Claims, 7 Drawing Sheets

(56) References Cited

U.S. PATENT DOCUMENTS

| | | | |
|---|---|---|---|
| 2009/0022194 | A1 | 1/2009 | Watanabe et al. |
| 2013/0170802 | A1 | 7/2013 | Pitwon |
| 2013/0322823 | A1 | 12/2013 | Huang |

FOREIGN PATENT DOCUMENTS

| | | | |
|---|---|---|---|
| JP | 2006208527 | A | 8/2006 |
| WO | WO2021086791 | A1 | 5/2021 |

OTHER PUBLICATIONS

Korean Patent Office, the first Office dated Jan. 10, 2025, for corresponding KR application No. 10-2023-7017618.

European Patent Office, the Extended European Search Report dated Sep. 11, 2024, for corresponding EP application No. 21885197.0.

* cited by examiner

OPTICAL-ELECTRONIC PRINTED CIRCUIT BOARD, PARAMETER DETERMINATION METHOD, ELECTRONIC DEVICE, AND STORAGE MEDIUM

CROSS-REFERENCE TO RELATED APPLICATIONS

This application claims the priority of Chinese patent application No. 202011160739.0 filed on Oct. 27, 2020, the entirety of which is incorporated hereby by reference.

TECHNICAL FIELD

The present disclosure relates to, but is not limited to, the field of printed circuit boards.

BACKGROUND

With the explosive increase of data traffic, the traditional printed circuit boards cannot meet the transmission requirements of long distance and low loss. To this end, optical-electronic printed circuit boards (OE-PCB) have been developed.

An optical-electronic printed circuit board includes a printed circuit board and an optical waveguide layer arranged in stack, and a waveguide core is disposed in the optical waveguide layer. During layout of the waveguide core, it is generally not guaranteed that the waveguide core is always in a straight state. Therefore, how to change the transmission direction of the waveguide core has become a technical problem to be solved in the field.

SUMMARY

The present disclosure provides a method for determining parameters of a waveguide core in an optical-electronic printed circuit board, an optical-electronic printed circuit board, an electronic device, and a computer-readable storage medium.

As a first aspect of the present disclosure, there is provided a method for determining parameters of a waveguide core in an optical-electronic printed circuit board, wherein the waveguide core includes a plurality of sidewalls which define a first waveguide segment and a second waveguide segment connected to the first waveguide segment; the plurality of sidewalls include a first sidewall and a second sidewall disposed opposed to each other in the first waveguide segment, and the first sidewall is parallel to the second sidewall; the plurality of sidewalls further include at least one third sidewall and at least one fourth sidewall in the second waveguide segment, the first sidewall is adjacent to and intersects one third sidewall, the second sidewall is adjacent to and intersects one fourth sidewall, the first sidewall and the third sidewall are located on a same side, and the second sidewall and the fourth sidewall are located on a same side.

The method includes: determining, according to a refractive index of a material from which the waveguide core is made and a refractive index of a material from which a base layer is made, a critical angle of total reflection at an interface between the waveguide core and the base layer; and determining the parameters of the waveguide core according to a relative positional relationship between one end port of the waveguide core and the other end port of the waveguide core in the optical-electronic printed circuit board, a condition of a region through which the waveguide core passes, and the critical angle, so that an incident angle of light transmitted through the first waveguide segment and impinging on the third sidewall of the waveguide core is not less than the critical angle, and an incident angle of light impinging on the fourth sidewall of the waveguide core is not less than the critical angle, wherein the parameters of the waveguide core include the number of the third sidewalls, the number of the fourth sidewalls, an angle of rotation of each fourth sidewall with respect to a previous sidewall connected thereto, and an angle of rotation of each third sidewall with respect to a previous sidewall connected thereto.

As a second aspect of the present disclosure, there is provided an optical-electronic printed circuit board, including a waveguide layer, including a base layer and at least one waveguide core in the base layer, wherein the waveguide core includes a plurality of sidewalls which define a first waveguide segment and a second waveguide segment connected to the first waveguide segment; the plurality of sidewalls include a first sidewall and a second sidewall disposed opposed to each other in the first waveguide segment, and the first sidewall is parallel to the second sidewall; the plurality of sidewalls further include at least one third sidewall and at least one fourth sidewall in the second waveguide segment, the first sidewall is adjacent to and intersects one third sidewall, the second sidewall is adjacent to and intersects one fourth sidewall, the first sidewall and the third sidewall are located on a same side, and the second sidewall and the fourth sidewall are located on a same side; and the parameters of the waveguide core are configured such that an incident angle of light transmitted through the first waveguide segment and impinging on the third sidewall of the waveguide core is not less than the critical angle, and an incident angle of light impinging on the fourth sidewall of the waveguide core is not less than the critical angle, wherein the parameters of the waveguide core include the number of the third sidewalls, the number of the fourth sidewalls, an angle of rotation of each fourth sidewall with respect to a previous sidewall connected thereto, and an angle of rotation of each third sidewall with respect to a previous sidewall connected thereto.

As a third aspect of the present disclosure, there is provided an electronic device, wherein the electronic device includes: one or more processors; a storage means having one or more programs stored thereon which, when executed by the one or more processors, cause the one or more processors to implement the method for determining parameters according to the first aspect of the present disclosure; and one or more I/O interfaces connected between the one or more processors and the storage means and configured to enable information interaction between the one or more processors and the storage means.

As a fourth aspect of the present disclosure, there is provided a computer-readable storage medium storing a computer program thereon which, when executed by a processor, causes the method for determining parameters according to the first aspect of the present disclosure to be implemented.

The present disclosure aims to enable steering of the waveguide core without introducing a curved surface to the waveguide core. In the method of the present disclosure, in order to enable steering of the waveguide core, each surface of the waveguide core is set to be planar, and an angle exists between two adjacent planes, so that light always propagates within the waveguide core without exiting the waveguide core, thereby improving the efficiency of light transmission.

When the parameters determined by the method for determining parameters of the present disclosure are applied to the waveguide core, an angle of rotation of each fourth sidewall in a first direction with respect to the second sidewall, and an angle of rotation of each third sidewall in the first direction with respect to the first sidewall, can achieve the effect that light always propagates in the waveguide core.

DETAIL DESCRIPTION OF EMBODIMENTS

Hereinafter, specific implementations of the present disclosure will be described with respect to the accompanying drawings. It will be appreciated that the specific implementations as set forth herein are merely for the purpose of illustration and explanation of the present disclosure but should not be constructed as a limitation thereof.

An optical-electronic printed circuit board includes a waveguide layer, and the waveguide layer includes a base layer and at least one waveguide core disposed in the base layer.

Figure 2:
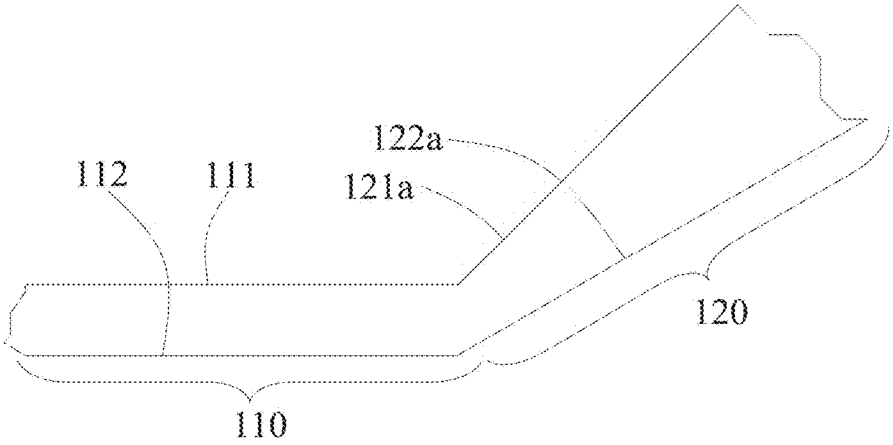
FIG. 2 is a schematic structural diagram of a first implementation of an optical-electronic printed circuit board according to the present disclosure, where a portion of a waveguide core is shown.

As an aspect of the present disclosure, there is provided a method for determining parameters of a waveguide core in an optical-electronic printed circuit board. As shown in FIG. 2, the waveguide core includes a plurality of sidewalls which define a first waveguide segment 110 and a second waveguide segment 120 connected to (continuous with) the first waveguide segment 110. In the present disclosure, as described below, the plurality of sidewalls are divided into at least four types, i.e., first, second, third, and fourth sidewalls. Furthermore, for the sake of clarity, structures of the optical-electronic printed circuit board other than the waveguide core are not shown in FIG. 2 and subsequent figures. It will be understood that the base layer is disposed immediately adjacent to the plurality of sidewalls of the waveguide core, so that at least a part of the sidewalls of the waveguide core forms the interface between the base layer and the waveguide core.

The first waveguide segment 110 includes a first sidewall 111 and a second sidewall 112 disposed opposed to each other, and the first sidewall 111 is parallel to the second sidewall 112.

The second waveguide segment 120 includes at least one third sidewall and at least one fourth sidewall, the first sidewall 111 is adjacent to and intersects one of the third sidewalls, and the second sidewall 112 is adjacent to and intersects one of the fourth sidewalls. The first sidewall 111 and the at least one third sidewall are located on a same side, and the second sidewall 112 and the at least one fourth sidewall are located on a same side. In addition, referring to FIGS. 4 to 9, when a plurality of third sidewalls and/or a plurality of fourth sidewalls are provided in the second waveguide segment, the plurality of third sidewalls are connected sequentially, and the plurality of fourth sidewalls are connected sequentially.

Figure 1:
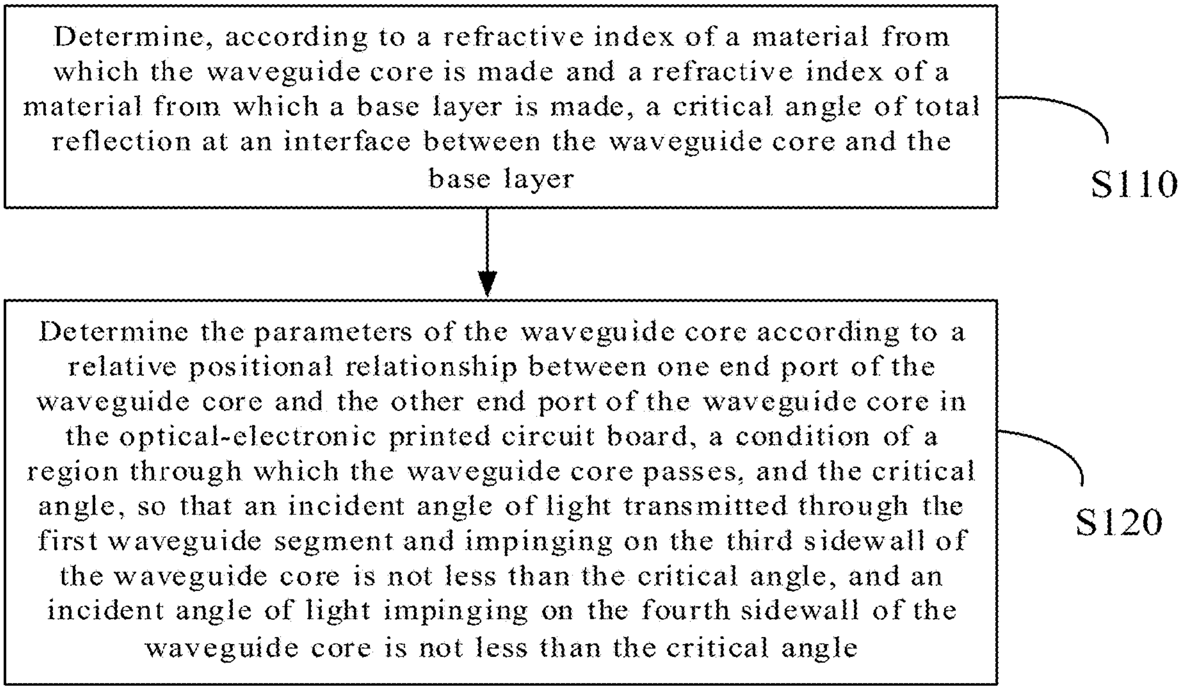
FIG. 1 is a flowchart of one implementation of a method for determining parameters of a waveguide core according to the present disclosure.

As shown in FIG. 1, the method includes steps S110 and S120.

At step S110, determining, according to a refractive index of a material from which the waveguide core is made and a refractive index of a material from which the base layer is made, a critical angle of total reflection at an interface between the waveguide core and the base layer.

At step S120, determining the parameters of the waveguide core according to a relative positional relationship between one end port of the waveguide core and the other end port of the waveguide core in the optical-electronic printed circuit board, a condition of a region through which the waveguide core passes, and the critical angle, so that an incident angle of light transmitted through the first waveguide segment and impinging on the third sidewall of the waveguide core is not less than the critical angle, and an incident angle of light impinging on the fourth sidewall of the waveguide core is not less than the critical angle, where the parameters of the waveguide core include the number of the third sidewalls, the number of the fourth sidewalls, an angle of rotation of each fourth sidewall with respect to a previous sidewall connected thereto, and an angle of rotation of each third sidewall with respect to a previous sidewall connected thereto.

It should be noted that the one end port of the waveguide core is the end port of the first waveguide segment 110 away from the second waveguide segment 120, and the other end port of the waveguide core is the end port of the second waveguide segment away from the first waveguide segment 110.

The condition of the region through which the waveguide core passes includes: there is no obstacle in the region through which the waveguide core passes, and there is an obstacle in the region through which the waveguide core passes. The obstacle here may refer to a via hole, an electronic component, a wire, or any other circuit structure. The waveguide core is required to avoid the obstacle in the region through which the waveguide core passes (exists).

In the related art, the extending direction of the waveguide core is changed by directly bending the waveguide core (i.e., introducing a curved surface to the waveguide core). However, when light propagates along the waveguide core and reaches the curved surface, the light may be emitted out from the curved surface, thereby reducing the transmission efficiency of optical signals.

The present disclosure aims to enable steering of the waveguide core without introducing a curved surface to the waveguide core. In the method of the present disclosure, in order to enable steering of the waveguide core, each surface (sidewall) of the waveguide core is set to be planar, and an angle exists between two adjacent planes, so that light always propagates within the waveguide core without exiting (the sidewall of) the waveguide core, thereby improving the efficiency of light transmission.

When the parameters determined by the method for determining parameters of the present disclosure are applied to the waveguide core, by means of an angle of rotation A1 of each fourth sidewall with respect to a previous sidewall (the second sidewall or another fourth sidewall) connected thereto, and an angle of rotation A2 of each third sidewall with respect to a previous sidewall (the first sidewall or another third sidewall) connected thereto, the effect that light always propagates in the waveguide core can be achieved.

The occurrence of total reflection of light requires the following two conditions: first, light enters an optically thinner medium from an optically denser medium; and second, an incident angle is equal to or larger than a critical angle. In the optical-electronic printed circuit board, the waveguide core 100 is made of an optically denser medium, and the base layer is made of an optically thinner medium. When light propagating in the waveguide core 100 impinges onto the interface between the waveguide core 100 and the base layer, total reflection will occur if the incident angle of the light is equal to or greater than the critical angle.

In step S110, according to a refractive index of a material from which the waveguide core is made and a refractive index of a material from which a base layer is made, a critical angle of total reflection at an interface between the waveguide core and the base layer is determined. In some optional implementations, the critical angle may be calculated by the following equation (1):

$$\sin \alpha = n2/n1 \qquad (1)$$

where α is the critical angle;

n1 is a refractive index of the optically denser medium; and n2 is a refractive index of the optically thinner medium.

As described above, in the present disclosure, in order to make light propagate within the waveguide core without leaking out, it should be firstly ensured that the light can be totally reflected in the second waveguide segment without leaking out. For ease of processing, and for ease of determining parameters of the waveguide core, the first waveguide segment may be arranged such that the first sidewall is parallel to the second sidewall.

Accordingly, the second waveguide segment includes at least one third sidewall and at least one fourth sidewall which satisfy:

$$0 < A1 \leq (90° - \alpha) \qquad (2);$$

$$A2 \geq A1 \qquad (3);$$

$$A1 \leq A3 \leq 2A1 \qquad (4);$$

where

A1 is an angle of rotation of the fourth sidewall intersecting the second sidewall with respect to the second sidewall;

A2 is an angle of rotation of the third sidewall intersecting the first sidewall with respect to the first sidewall;

A3 is an angle of rotation of other fourth sidewalls with respect to the second sidewall except the fourth sidewall intersecting the second sidewall; and α is a critical angle of total reflection of light at the interface between the waveguide core and the base layer.

As described above, the fact that "the second waveguide segment includes at least one third sidewall and at least one fourth sidewall" includes:

a first case where the second waveguide segment includes one third sidewall and one fourth sidewall;

a second case where the second waveguide segment includes a plurality of third sidewalls and one fourth sidewall;

a third case where the second waveguide segment includes a plurality of third sidewalls and a plurality of fourth sidewalls; or a fourth case where the second waveguide segment includes one third sidewall and a plurality of fourth sidewalls.

These cases will be demonstrated and explained below with reference to the drawings, respectively.

Figure 3:
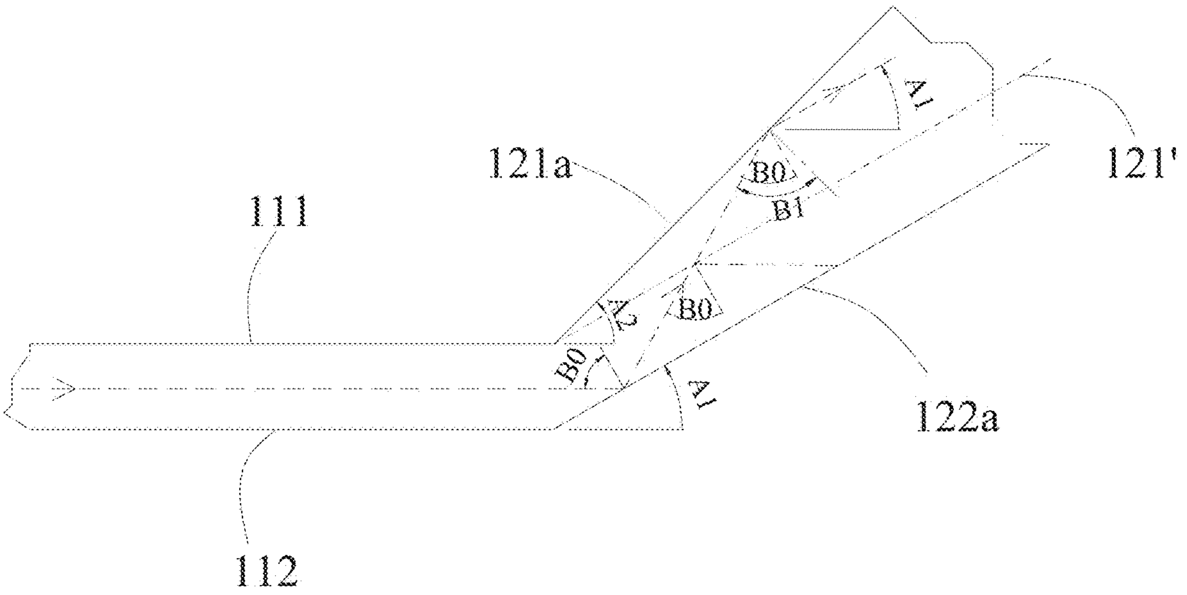
FIG. 3 is a schematic diagram illustrating propagation of light in the waveguide core shown in FIG. 2.

The first case is illustrated in FIGS. 2 and 3, where the second waveguide segment 120 of the waveguide core is shown to include one third sidewall 121*a* and one fourth sidewall 122*a*. To ensure total reflection of the light in the waveguide core, the angle of rotation of the third sidewall 121*a* with respect to the sidewall (the first sidewall 111) intersecting the third sidewall is configured such that light reflected from the fourth sidewall 122*a* toward the third sidewall 121*a* is reflected by the third sidewall 121*a* and forms light with a propagation direction parallel to the fourth sidewall 122*a*.

In some optional implementations, the third sidewall 121*a* and the fourth sidewall 122*a* satisfy:

$$0 < A1 \leq (90° - \alpha); \text{ and}$$

$$A2 \leq A1.$$

As shown in FIG. 3, after entering the first waveguide segment 110, the light propagates along the first waveguide segment 110, and impinges onto the fourth sidewall 122*a* (i.e., at the interface between the waveguide core 100 and the base layer), with an incident angle of B0. As can be easily derived from FIG. 3, B0=90°−A1. Since the angle of rotation A1 of the fourth sidewall 122*a* with respective to the second sidewall 112 satisfies A1≤(90°−α), an inequality (90°−B0)≤(90°−α) can be easily obtained by conversion, that is, B0≥α. In other words, the incident angle B0 of the light at the interface between the waveguide core 100 and the base layer is greater than or equal to the critical angle α of total reflection, and therefore, the light is totally reflected at the interface between the waveguide core 100 and the base layer, and then continues to propagate in the second waveguide segment 120, rather than exiting the waveguide core.

Further, as shown in FIG. 3, the light propagating in the second waveguide segment 120, after impinging on the third sidewall 121*a* (i.e., at the interface between the waveguide core and the base layer), is reflected by the third sidewall 121*a*. To enable the light to continue to propagate in the second waveguide segment 120, the condition that the light continues to be totally reflected at the third sidewall is required to be satisfied. That is, an incident angle B1 of the light at the third sidewall is still greater than or equal to the critical angle α.

The two-dot chain line 121' in FIG. 3 is parallel to the fourth sidewall 122*a*, and light reflected from the fourth sidewall 122*a* toward the two-dot chain line 121' has an incident angle B0. In the case where the angle of rotation A2 of the third sidewall 121*a* with respect to the first sidewall 111 is greater than A1, the incident angle B1 of light at the third sidewall 121*a* is necessarily greater than the angle B0. Since B0≥α, B1>α, which also satisfies the condition for total reflection. That is, light impinging on the third sidewall 121*a* will further propagate in the second waveguide segment 120.

Light reflected by the third sidewall 121*a* is required to be parallel to, or deflected toward, the fourth sidewall 122*a*. This requires that the angle of rotation A2 of the third sidewall with respective to the first sidewall is greater than or equal to the angle of rotation A1 of the fourth sidewall with respect to the second sidewall in a first direction. As an optional implementation, when the angle of rotation A2 of the third sidewall with respective to the first sidewall is equal to 1.5 times the angle of rotation A1 with respect to the second sidewall (i.e., A2=1.5A1) in the first direction, the light reflected by the third sidewall is parallel to the fourth sidewall from which the light is emitted.

Figure 4:
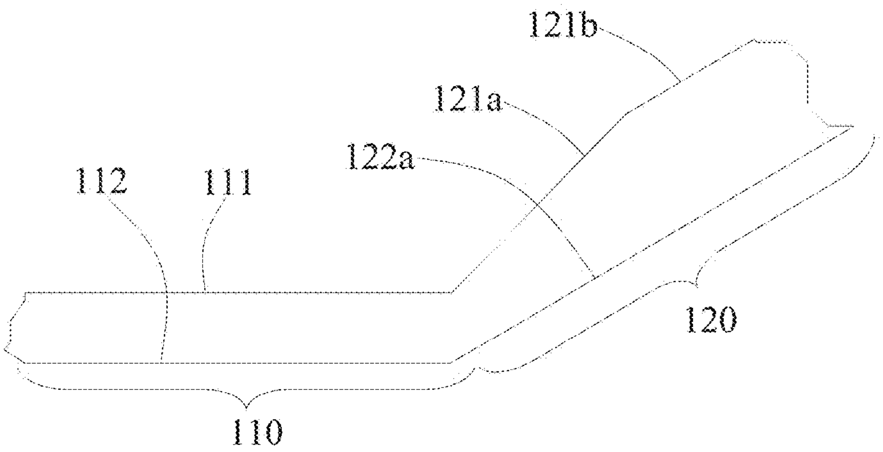
FIG. 4 is a schematic structural diagram of a second implementation of an optical-electronic printed circuit board according to the present disclosure, where a portion of a waveguide core is shown.
Figure 5:
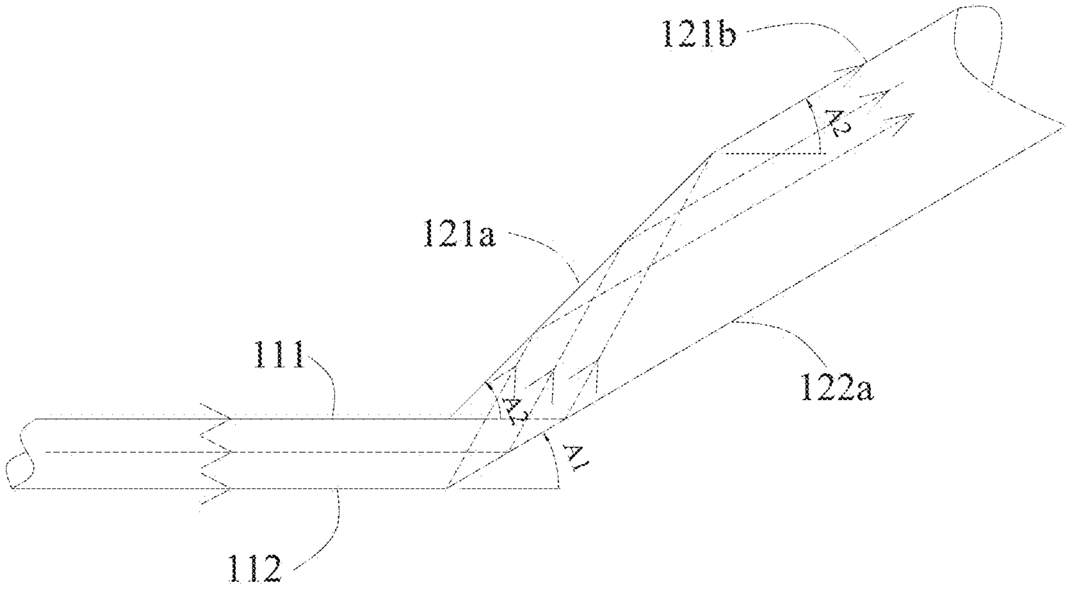
FIG. 5 is a schematic diagram illustrating propagation of light in the waveguide core shown in FIG. 4.

The second case is shown in FIGS. 4 and 5. The second waveguide segment 120 includes two third sidewalls (a third sidewall 121*a* and a third sidewall 121*b*, respectively) and one fourth sidewall 122*a*. It should be noted that since there is merely one fourth sidewall 122*a*, it is not necessary to satisfy inequality (4) in this case. In addition to inequalities (2) and (3), the following condition is also required to be satisfied: an angle of rotation of a latter third sidewall with respect to the first sidewall is smaller than an angle of rotation of a former third sidewall with respect to the first sidewall. The principle of light propagation is explained in detail below in connection with FIG. 5.

FIG. 5 is a schematic diagram illustrating propagation of light in the waveguide core shown in FIG. 4. As shown in FIG. 5, light (light rays) incident into the first waveguide segment 110 is divided into three types: a first type of light incident along the first sidewall 111; a second type of light incident between the first sidewall 111 and the second sidewall 112; and a third type of light incident along the second sidewall 112.

As shown in FIG. 5, the light incident along the first sidewall 111 is totally reflected after reaching the fourth sidewall 122*a*, with the propagation direction changed to a direction of propagating toward the third sidewall, and after reaching a boundary between the third sidewall 121*a* and the third sidewall 121*b*, the light is further totally reflected, with the propagation direction changed to a direction the same as the direction of the third sidewall 121*b*, and propagates along the third sidewall 121*b*.

The light incident along the second sidewall 112 is totally reflected at an intersection between the second sidewall 112 and the fourth sidewall 122*a*, with the propagation direction changed to a direction toward the third sidewall, and the light is further totally reflected at the third sidewall 121*a*, with the propagation direction changed to a direction the same as the direction of the third sidewall 121*b*.

The light incident between the first sidewall 111 and the second sidewall 112 is totally reflected after impinging onto the fourth sidewall 122*a*, with the propagation direction changed to a direction toward the third sidewall 121*a*. After reaching the third sidewall 121*a*, the light is totally reflected at the third sidewall 121*a*, with the propagation direction changed to a direction the same as the direction of the third sidewall 121*b*.

The light reflected by the third sidewall and the fourth sidewall is adjusted to a propagation direction parallel to the fourth sidewall, so that the light can smoothly propagate in the first waveguide segment and the second waveguide segment of the waveguide core, and the light propagation efficiency is improved.

The above merely explains the case where the second waveguide segment includes two third sidewalls. If more third sidewalls are provided in the second waveguide segment, the total reflection of light can be ensured as long as a deflection angle of a latter third sidewall with respect to the first sidewall is ensured to be smaller than a deflection angle of a former third sidewall with respect to the first sidewall.

Figure 6:
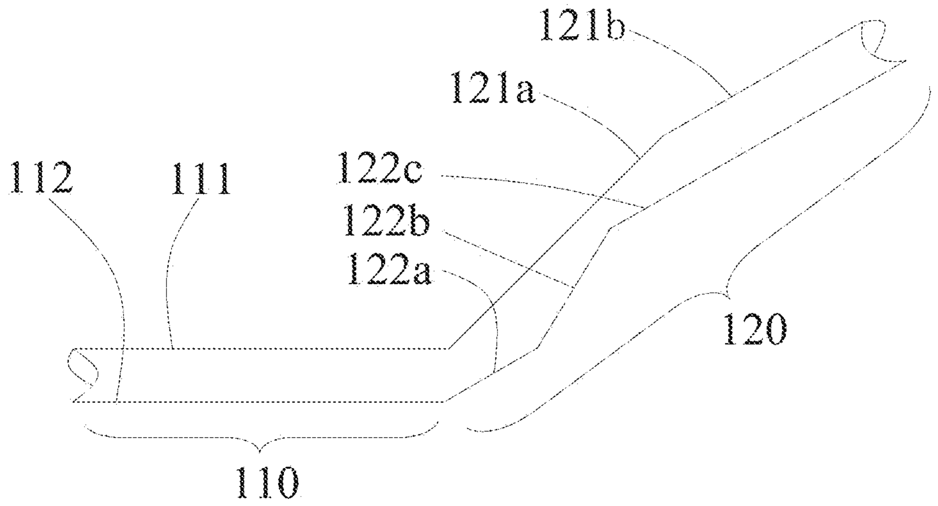
FIG. 6 is a schematic structural diagram of a third implementation of an optical-electronic printed circuit board according to the present disclosure, where a portion of a waveguide core is shown.
Figure 8:
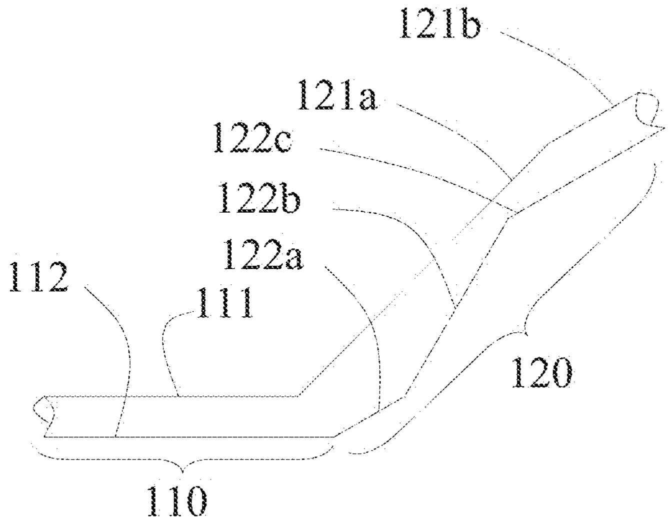
FIG. 8 is a schematic structural diagram of a fourth implementation of an optical-electronic printed circuit board according to the present disclosure, where a portion of a waveguide core is shown.

FIGS. 6 and 8 both show cases where the second waveguide segment includes two third sidewalls and three fourth sidewalls. The difference between FIG. 6 and FIG. 8 lies in that, in the implementation shown in FIG. 6, the position where the 1st third sidewall appears is after the position where the first fourth sidewall appears, whereas in the implementation shown in FIG. 8, the position where the 1st third sidewall appears is before the position where the first fourth sidewall appears.

Figure 7:
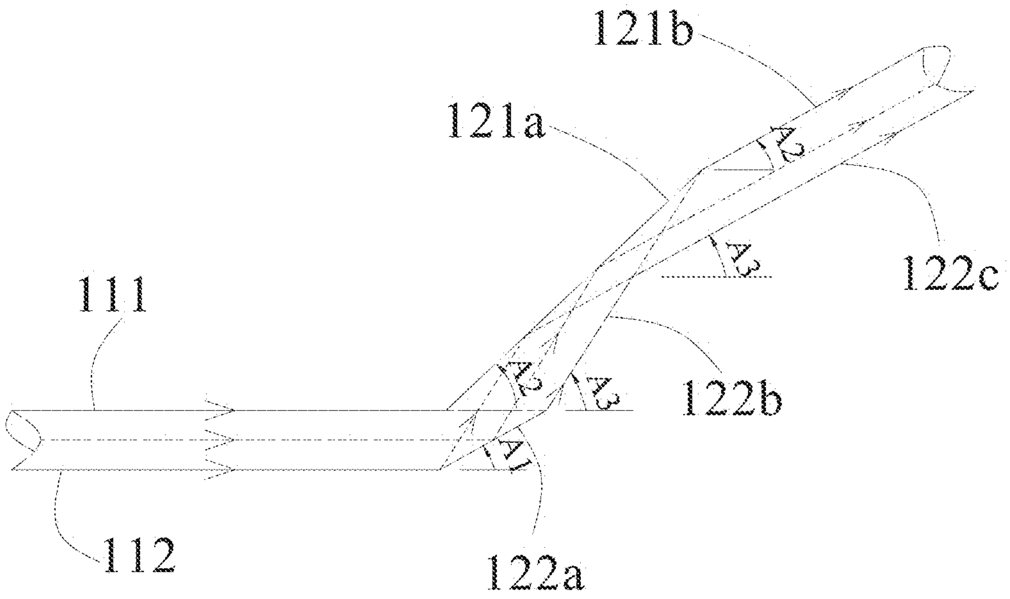
FIG. 7 is a schematic diagram illustrating propagation of light in the waveguide core shown in FIG. 6.
Figure 9:
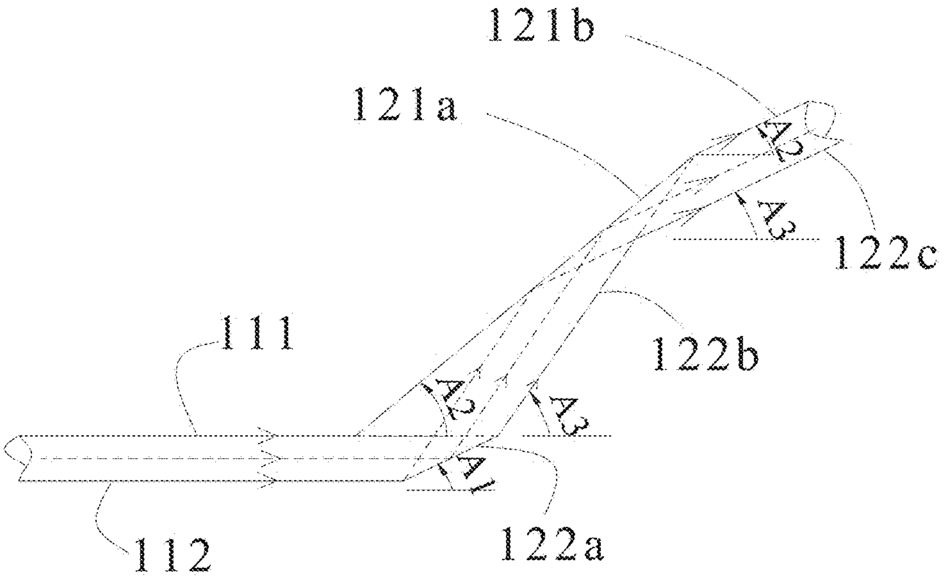
FIG. 9 is a schematic diagram illustrating propagation of light in the waveguide core shown in FIG. 8.

As shown in FIGS. 7 and 9, the light incident along the first sidewall 111 impinges at a boundary of a fourth sidewall 122*a* and a fourth sidewall 122*b*, and is totally reflected, with the propagation direction of light changed to a direction of propagating toward the third sidewall 121*a*. According to the total reflection characteristics of light, after the light originally impinging at the boundary of the fourth sidewall 122*a* and the fourth sidewall 122*b* is totally reflected in sequence, the propagation direction of light is deflected by an angle of 2 times A1 with respect to the propagation direction before the total reflection, and in order to make the light totally reflected at the third sidewall 121*a* after reaching the third sidewall 121*a*, A1≤A3≤2A1 should be satisfied.

In the implementation shown in FIGS. 7 and 9, after the light originally impinging at the boundary of the fourth sidewall 122*a* and the fourth sidewall 122*b* is totally reflected twice, the propagation direction of light is changed to a direction of propagating along the third sidewall 121*b* parallel to the fourth sidewall 122*a* and the fourth sidewall 122*c*.

The light incident along the second sidewall 112 is totally reflected at an intersection of the second sidewall 112 and the fourth sidewall 122*a*, with the propagation direction of light changed to a direction of propagating toward the third sidewall 121*a*. After reaching the third sidewall 121*a*, the light is totally reflected at the third sidewall 121*a*, with the propagation direction of light changed to a direction parallel to the fourth sidewall 122*a* and the fourth sidewall 122*c*.

After the light incident between the first sidewall 111 and the second sidewall 112 impinges onto the fourth sidewall 122*a*, the light is totally reflected at the fourth sidewall 122*a*, with the propagation direction changed to a direction of propagating toward the third sidewall. After reaching the third sidewall 121*a*, the light is totally reflected at the third sidewall 121*a*, with the propagation direction of light changed to a direction parallel to the fourth sidewall 122*a* and the fourth sidewall 122*c*.

In the present disclosure, how to determine the number of third and fourth sidewalls is not particularly limited. For example, the number of the third and fourth sidewalls may be set in advance. For example, the number of the third sidewalls is set to 1, and the number of the fourth sidewalls is set to 1 in advance. Then, according to a relative positional relationship between one end port of the waveguide core and the other end port of the waveguide core, and a condition of a region through which the waveguide core passes, a first initial deflection angle of the third sidewall with respect to the first sidewall and a second initial deflection angle of the fourth sidewall with respect to the second sidewall are determined. Next, it is judged whether the first initial deflection angle and the second initial deflection angle satisfy a condition that "an incident angle of light transmitted through the first waveguide segment and impinging on the third sidewall of the waveguide core is not less than the critical angle, and an incident angle of light impinging on the fourth sidewall of the waveguide core is not less than the critical angle". If the first initial deflection angle and the second initial deflection angle satisfy the above condition, the first initial deflection angle is taken as the angle A2, and the second initial deflection angle is taken as the angle A1. If the first initial deflection angle or the second initial deflection angle does not satisfy the above condition, the number of third sidewalls, the number of the fourth sidewalls, the angle of deflection (rotation) of the third sidewall with respective to the first sidewall, and the angle of deflection of the fourth sidewall with respective to the second sidewall are adjusted, until the condition that "an incident angle of light transmitted through the first waveguide segment and impinging on the third sidewall of the waveguide core is not less than the critical angle, and an incident angle of light impinging on the fourth sidewall of the waveguide core is not less than the critical angle" is satisfied.

Accordingly, step S120 may include:

- receiving a first initial preset number of third sidewalls and a second initial preset number of the fourth sidewalls;
- determining, according to the first initial preset number and the second initial preset number, a first initial angle of deflection of each third sidewall with respect to a previous sidewall connected thereto, and a second initial angle of deflection of the fourth sidewall with respect to a previous sidewall connected thereto;
- judging whether the first initial preset number and the second initial preset number satisfy a condition that "an incident angle of light transmitted through the first waveguide segment and impinging on the third sidewall of the waveguide core is not less than the critical angle, and an incident angle of light impinging on the fourth sidewall of the waveguide core is not less than the critical angle";
- taking, in response to determining that the condition is satisfied, the first initial angle as the angle of deflection of the third sidewall with respect to the previous sidewall connected thereto, the second initial angle as the angle of deflection of the fourth sidewall with respect to the sidewall connected thereto, the first initial preset number as the number of third sidewalls, and the second initial preset number as the number of the fourth sidewalls; and
- adjusting, if the judgment result indicates that the condition is not satisfied, at least one of the first initial angle, the second initial angle, the first initial preset number or the second initial preset number, until the condition that "an incident angle of light transmitted through the first waveguide segment and impinging on the third sidewall of the waveguide core is not less than the critical angle, and an incident angle of light impinging on the fourth sidewall of the waveguide core is not less than the critical angle" is satisfied, and taking the current number of third sidewalls, the current number of the fourth sidewalls, the current angle of deflection of the third sidewall with respect to the previous sidewall connected thereto, and the current angle of deflection of the fourth sidewall with respect to the sidewall connected thereto as the parameters of the waveguide core.

In the present disclosure, in the operation of "receiving a first initial preset number of third sidewalls and a second initial preset number of fourth sidewalls", the first initial preset number and the second initial preset number may be parameters input by a designer through an input device, such as a keyboard or a touch screen.

In the present disclosure, the number of the first and second waveguide segments in the waveguide core is not particularly limited. Apparently, it is also possible to include more than just the first and second waveguide segments in the waveguide core. The specific structure of the waveguide core may be determined according to a length of the waveguide core. The latter case is not particularly limited. As an optional implementation, the waveguide core further includes a plurality of second waveguide segments, and a plurality of first waveguide segments connected to the second waveguide segments. Further, the plurality of sidewalls of the waveguide core may further include at least one fifth sidewall and at least one sixth sidewall. The at least one fifth sidewall and the at least one sixth sidewall are in one-to-one correspondence and disposed oppositely to define third waveguide segments, one end of the third waveguide segment is connected to the second waveguide segment, the other end of the third waveguide segment is connected to the first waveguide segment. Two ends of the fifth sidewall are respectively connected to the corresponding third sidewall and first sidewall, two ends of the sixth sidewall are respectively connected to the corresponding fourth sidewall and second sidewall, and the sixth sidewall is coplanar with the sidewall connected to the sixth sidewall. Moreover, for a non-last third waveguide segment, the fifth sidewall is coplanar with the first sidewall connected to the fifth sidewall.

For one waveguide core, there are two cases: in a first case, one of the first waveguide segments is located at one end of the waveguide core, and one of the second waveguide segments is located at the other end of the waveguide core; and in a second case, one of the first waveguide segments is located at one end of the waveguide core, and one of the third waveguide segments is located at the other end of the waveguide core.

For a third waveguide segment in a middle part of the waveguide core: one end of the third waveguide segment is connected to a second waveguide segment adjacent to the third waveguide segment, the other end of the third waveguide segment is connected to a first waveguide segment adjacent to the third waveguide segment; two ends of the fifth sidewall are respectively connected to the corresponding third sidewall and first sidewall, two ends of the sixth sidewall are respectively connected to the corresponding fourth sidewall and second sidewall, and the fifth sidewall is coplanar with the first sidewall connected to the fifth sidewall, and the sixth sidewall is coplanar with the fourth sidewall connected to the sixth sidewall.

For a third waveguide segment at an end of the waveguide core: one end of the third waveguide segment is connected to a second waveguide segment adjacent to the third waveguide segment, one end of the fifth sidewall is connected to the corresponding third sidewall, one end of the sixth sidewall is connected to the corresponding fourth sidewall, and the sixth sidewall is coplanar with the fourth sidewall connected to the sixth sidewall.

Since the fifth sidewall and the sixth sidewall are parallel to each other, the sixth sidewall is coplanar with the fourth sidewall connected to the sixth sidewall, and the light emitted from the second waveguide segment is in a direction parallel to the fourth sidewall, the light emitted from the second waveguide segment can propagate in the third waveguide segment in a direction parallel to the fifth sidewall and the sixth sidewall without exiting the third waveguide segment.

By arranging the third waveguide segments in the above manner (i.e., two adjacent third waveguide segments are connected to each other via the first waveguide segment and the second waveguide segment), the following relative positional relationship between the one end port of the waveguide core and the other end port of the waveguide core in the optical-electronic printed circuit board may be achieved: an angle exists between the one end port of the waveguide core and the other end port of the waveguide core in the optical-electronic printed circuit board.

Figure 10:
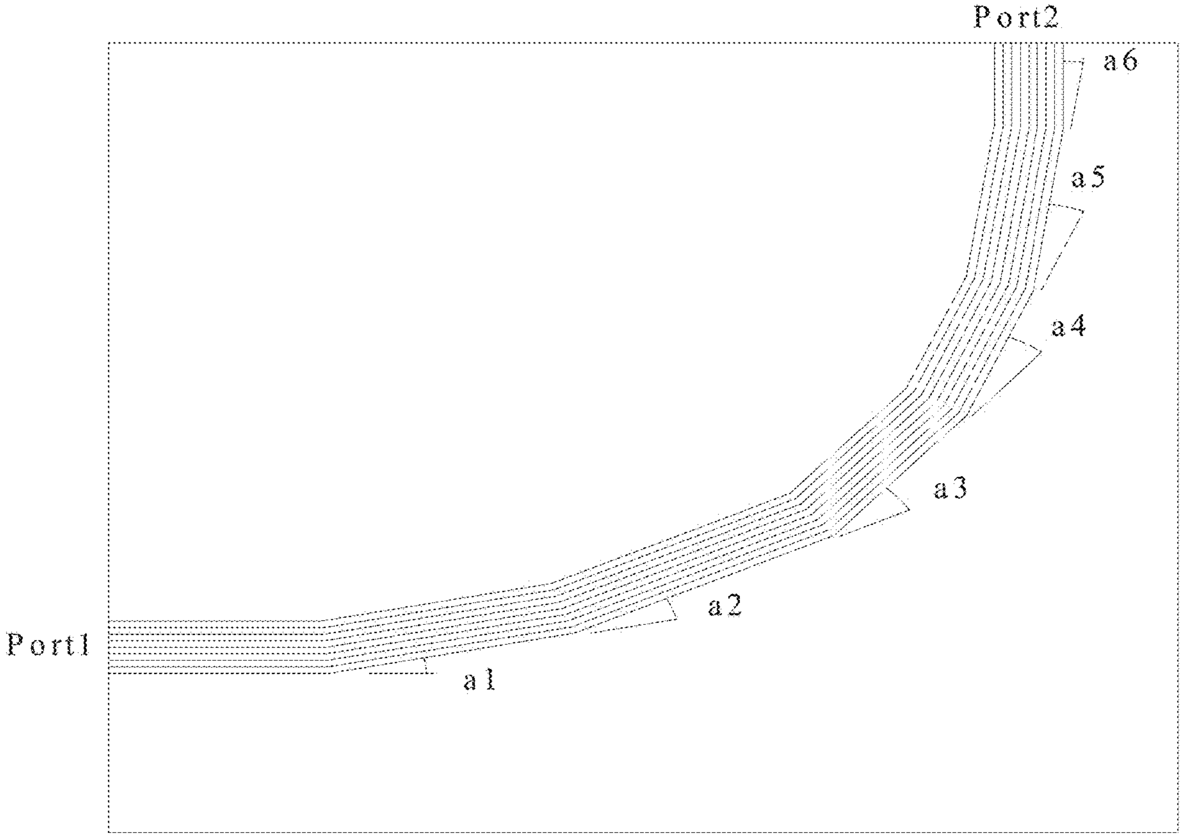
FIG. 10 is a schematic structural diagram of a fifth implementation of an optical-electronic printed circuit board according to the present disclosure.

In some optional implementations, as shown in FIG. 10, the waveguide core includes a plurality of third waveguide segments, and the parameters of the waveguide core further include an angle of rotation of the sixth sidewall in a latter one of two adjacent third waveguide segments with respect to the sixth sidewall in a former one of the third waveguide segments. Further, the angle of rotation of the sixth sidewall in the latter one of two adjacent third waveguide segments with respect to the sixth sidewall in the former one of the third waveguide segments satisfies the following relational expressions (5) to (6):

$$0<a_i<(90°-\alpha) \quad (5); \text{ and}$$

$$0<a_1<(90°-\alpha) \quad (6);$$

where i is a serial number of a third waveguide segment, i is a natural number, and 2≤i≤N; where N is a natural number greater than 2; and in a direction from the one end port of the waveguide core to the other end port of the waveguide core in the optical-electronic printed circuit board, the third waveguide segments, the first waveguide segments, and the second waveguide segments are sequentially numbered, respectively;

$a_1$ is an angle of rotation of the sixth sidewall in the $i^{th}$ third waveguide segment in a first direction with respect to the sixth sidewall in the $(i-1)^{th}$ third waveguide segment; and $a_1$ is an angle of rotation of the sixth sidewall in a $1^{st}$ third waveguide segment in the first direction with respect to the second sidewall in a $1^{st}$ first waveguide segment (i.e., a first one of the first waveguide segments).

Figure 11:
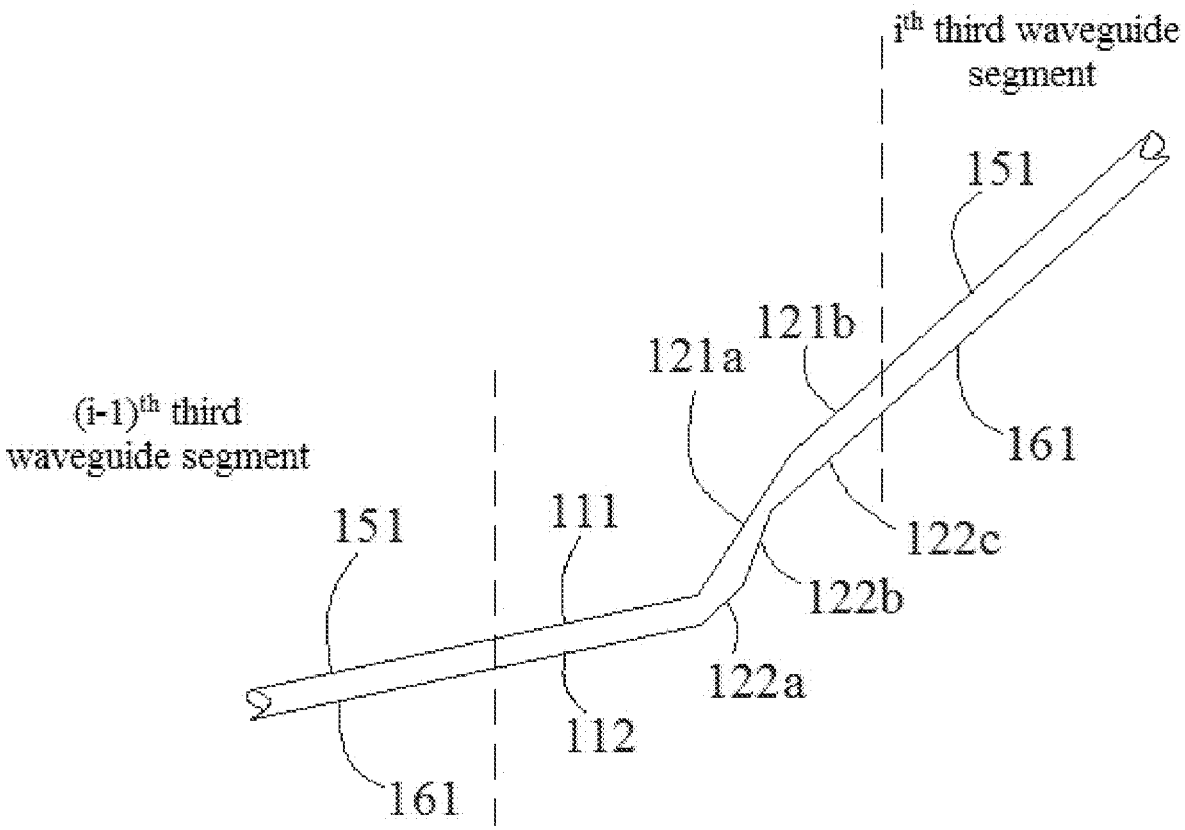
FIG. 11 is a diagram showing a connection relationship between an $(i-1)^{th}$ third waveguide segment and an $i^{th}$ third waveguide segment.

FIG. 11 is a diagram showing a connection relationship between the $(i-1)^{th}$ third waveguide segment and the $i^{th}$ third waveguide segment. As shown in FIG. 11, a sixth sidewall 161 in the $(i-1)^{th}$ third waveguide segment is connected to and coplanar with the second sidewall 112, and a fifth sidewall 151 in the $(i-1)^{th}$ third waveguide segment is connected to and coplanar with the first sidewall 111; and the sixth sidewall 161 in the $(i-1)^{th}$ third waveguide segment is connected to and coplanar with the fourth sidewall 122*c*.

In FIG. 11, the corner structure (which includes the first waveguide segment and the second waveguide segment) connecting the $(i-1)^{th}$ third waveguide segment and the $i^{th}$ third waveguide segment is the structure having the first waveguide segment and the second waveguide segment shown in FIG. 7, but the present disclosure is not limited thereto, and the specific shape of the corner structure connecting two adjacent third waveguide segments may be determined according to an angle between the sixth sidewalls in the two adjacent third waveguide segments.

It should be noted that for the sidewalls of two adjacent third waveguide segments, the sidewalls of a latter third waveguide segment are deflected in the first direction with respect to the sidewalls of a former third waveguide segment. That is, a plurality of fifth sidewalls have the same deflection trend, and accordingly, a plurality of sixth sidewalls also have the same deflection trend. In the implementation shown in FIG. 10, a latter one of two adjacent sidewalls is deflected counterclockwise from a former one. In the implementation shown in FIG. 10, an angle of 90° exists between the one end port of the waveguide core and the other end port of the waveguide core. Further, N is 6, and $0<a_1, a_2, a_3, a_4, a_5, a_6<90°-\alpha$.

Figure 12:
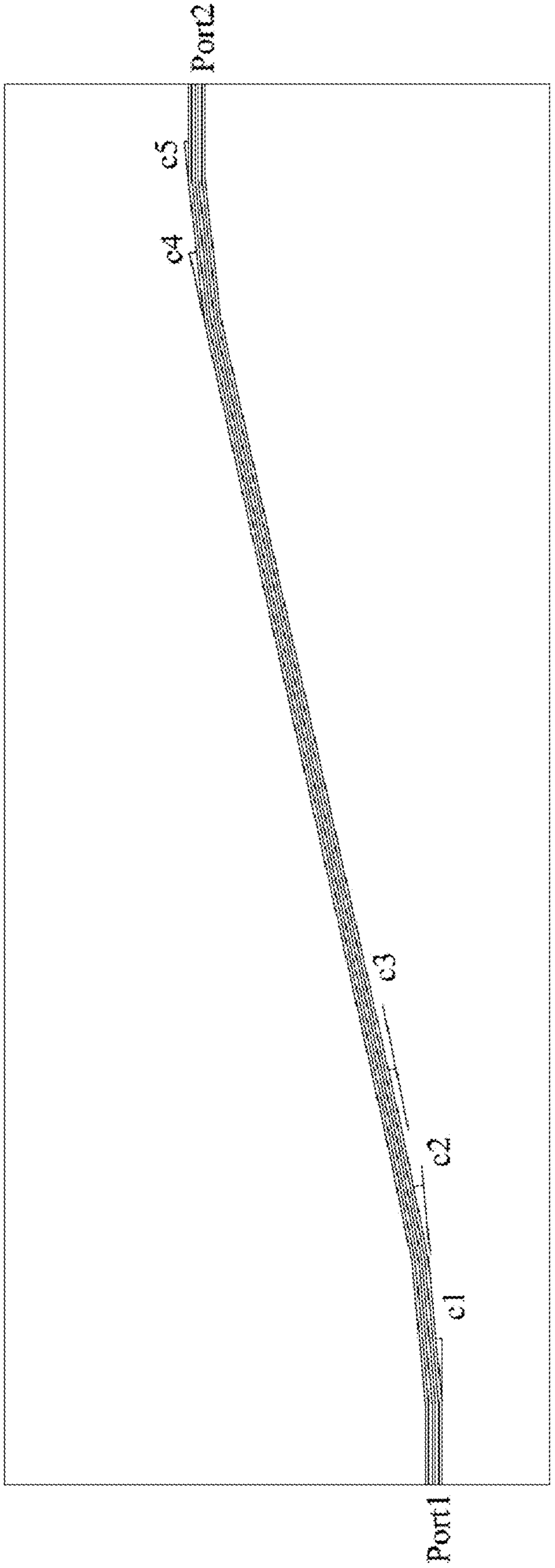
FIG. 12 is a schematic structural diagram of a sixth implementation of an optical-electronic printed circuit board according to the present disclosure.

In the implementation shown in FIG. 12, a distance along a second direction exists between the one end port of the waveguide core and the other end port of the waveguide core. A first waveguide segment and a third waveguide segment are respectively located at two end ports of the optical-electronic printed circuit board and are parallel to each other, and the second direction is perpendicular to an extending direction of a $1^{st}$ first waveguide segment.

In the implementation shown in FIG. 12, the plurality of sidewalls of the waveguide core further include at least one fifth sidewall and at least one sixth sidewall in one-to-one correspondence and disposed oppositely to define third waveguide segments, the waveguide core includes K third waveguide segments, the fifth sidewalls are located on one side of a center line of the waveguide core, and the sixth sidewall is located on the other side of the center line of the waveguide core. The fifth sidewall is coplanar with the sidewall connected to the fifth sidewall, and the sixth sidewall is coplanar with the sidewall connected to the sixth sidewall.

For each of first M third waveguide segments: one end of the third waveguide segment is connected to the second waveguide segment, the other end of the third waveguide segment is connected to the first waveguide segment, and the first sidewall and the third sidewall are both located on a same side of the center line as the fifth sidewall.

For each of the $(M+1)^{th}$ to the $k^{th}$ third waveguide segments: one end of the third waveguide segment is connected to the second waveguide segment, the other end of the third waveguide segment is connected to the first waveguide segment, and the first sidewall and the third sidewall are both located on a same side of the center line as the sixth sidewall.

In two adjacent third waveguide segments, the sixth sidewall in a latter one of the two adjacent third waveguide segments is rotated at an angle of rotation with respect to the sixth sidewall in a former one of the two adjacent third waveguide segments, and the angle of rotation of the sixth sidewall in the latter one of the two adjacent third waveguide segments with respect to the sixth sidewall in the former one of the two adjacent third waveguide segments satisfies the following relational expressions (7) to (9):

$$0<c_j<(90°-\alpha), 1\leq j\leq M \quad (7);$$

$$0<c_l<(90°-\alpha), M\leq l<K \quad (8); \text{ and}$$

$$0<c_1<(90°-\alpha) \quad (9);$$

where j and l are both serial numbers of third waveguide segments, and in a direction from the one end port of the waveguide core to the other end port of the waveguide core in the optical-electronic printed circuit board, the third waveguide segments, the first waveguide segments, and the second waveguide segments are sequentially numbered, respectively;

$c_j$ is an angle of rotation of the sixth sidewall in an $j^{th}$ third waveguide segment in a first direction with respect to the sixth sidewall in an $(j-1)^{th}$ third waveguide segment;

$c_l$ is an angle of rotation of the sixth sidewall in an $l^{th}$ third waveguide segment in a third direction with respect to a sidewall in a previous third waveguide segment adjacent to the $l^{th}$ third waveguide segment on a same side of the center line as the sixth sidewall in the $l^{th}$ third waveguide segment, where M<K, and M and K are both natural numbers, and one of the first direction and the third direction is clockwise, while the other one is counterclockwise; and $c_1$ is an angle of rotation of the sixth sidewall in a $1^{st}$ third waveguide segment in the first direction with respect to the second sidewall in a $1^{st}$ first waveguide segment.

In the implementation shown in FIG. 12, K is 5, M is 3, and $0<c_1, c_2, c_3, c_4, c_5<(90°-\alpha)$.

As a second aspect of the present disclosure, there is provided an optical-electronic printed circuit board, including a waveguide layer which, as shown in FIG. 2, includes a base layer (not shown) and at least one waveguide core in the base layer.

The waveguide core includes a plurality of sidewalls which define a first waveguide segments 110 and a plurality of second waveguide segments 120. In the present disclosure, the plurality of sidewalls are divided into four types, i.e., first sidewalls, second sidewalls, third sidewalls, and fourth sidewalls.

In some optional implementations, the waveguide core 100 includes a first waveguide segment 110 and a second waveguide segment 120 connected to the first waveguide segment 110. The first waveguide segment 110 includes a first sidewall 111 and a second sidewall 112 disposed opposed to each other, and the second waveguide segment 120 includes at least one third sidewall and at least one fourth sidewall.

The first sidewall 111 intersects one of the third sidewalls, the second sidewall 112 intersects one of the fourth sidewall, the first sidewall 111 and the third sidewalls are located on a same side, and the second sidewall 112 and the fourth sidewalls are located on a same side.

The parameters of the waveguide core are configured such that an incident angle of light transmitted through the first waveguide segment and impinging on the third sidewall of the waveguide core is not less than the critical angle, and an incident angle of light impinging on the fourth sidewall of the waveguide core is not less than the critical angle. The parameters of the waveguide core include the number of the third sidewalls, the number of the fourth sidewalls, an angle of rotation of each fourth sidewall with respect to a previous sidewall connected thereto, and an angle of rotation of each third sidewall with respect to a previous sidewall connected thereto.

The parameters of the waveguide core can be determined with the above method of the present disclosure. The working principle and beneficial effects of the waveguide core with the above structure have been described in detail before, and thus are not repeated here.

As described above, for some optical-electronic printed circuit boards with vias, the waveguide core may bypass the vias by setting the angle of deflection (rotation) of the third sidewall in the second waveguide segment with respective to the first sidewall, and the angle of deflection of the fourth sidewall with respective to the second sidewall, so as to ensure that the waveguide core is not interrupted, and light leakage from the waveguide core is avoided, thereby making the optical-electronic printed circuit board of the present disclosure suitable for more occasions.

In the present disclosure, the first sidewall 111 is disposed parallel to the second sidewall 112. As an optional implementation, the first waveguide segment 110 has a rectangular cross section, and accordingly, the first waveguide segment 110 may further include two connecting sidewalls connecting the first sidewall 111 and the second sidewall 112.

On the basis that the first waveguide segment 110 has a rectangular cross section, the second waveguide segment also has a rectangular cross section. Apparently, the present disclosure is not limited thereto, and the first waveguide segment 110 may also have a cross section of any other shape.

As described above, as an optional implementation, the first sidewall is parallel to the second sidewall, the second waveguide segment includes at least one third sidewall and at least one fourth sidewall which satisfy:

$$0<A1\leq(90°-\alpha);$$

$$A2\geq A1; \text{ and}$$

$$A1\leq A3\leq 2A1;$$

where

A1 is an angle of rotation of the fourth sidewall intersecting the second sidewall with respect to the second sidewall;

A2 is an angle of rotation of the third sidewall intersecting the first sidewall with respect to the first sidewall;

A3 is an angle of rotation of other fourth sidewalls with respect to the second sidewall except the fourth sidewall intersecting the second sidewall; and α is a critical angle of total reflection of light at the interface between the waveguide core and the base layer.

In the present disclosure, the number of the third sidewalls 121 and the number of the fourth sidewalls in the second waveguide segment are not particularly limited. In the implementation shown in FIGS. 2 and 3, the second waveguide segment 120 includes one third sidewall 121*a* and one fourth sidewall 122*a*.

In some optional implementations, the second waveguide segment includes a plurality of third sidewalls and one fourth sidewall. An angle of rotation of a latter one of any two adjacent third sidewalls with respect to the first sidewall is smaller than an angle of rotation of a former third sidewall with respect to the first sidewall. In the implementation shown in FIGS. 4 and 5, the second waveguide segment 120 includes two third sidewalls (a third sidewall 121*a* and a third sidewall 121*b*, respectively) and one fourth sidewall 122*a*, and a third sidewall (i.e., the third sidewall 121*b*) away from the first sidewall 111 is parallel to the fourth sidewall 122*a*.

FIG. 5 shows a schematic diagram illustrating propagation of light in the waveguide core shown in FIG. 4. As shown in FIG. 5, light incident into the first waveguide segment 110 is divided into three types: a first type of light incident along the first sidewall 111; a second type of light incident between the first sidewall 111 and the second sidewall 112; and a third type of light incident along the second sidewall 112.

As shown in FIG. 5, the light incident along the first sidewall 111 is totally reflected after reaching the fourth sidewall 122*a*, with the propagation direction changed to a direction of propagating toward the third sidewall; and after reaching a boundary between the third sidewall 121*a* and the third sidewall 121*b*, the light is further totally reflected, with the propagation direction changed to a direction the same as the direction of the third sidewall 121*b*, and propagates along the third sidewall 121*b*.

The light incident along the second sidewall 112 is totally reflected at an intersection of the second sidewall 112 and the fourth sidewall 122*a*, with the propagation direction changed to a direction toward the third sidewall; and the light is further totally reflected at the third sidewall 121*a*, with the propagation direction changed to a direction the same as the direction of the third sidewall 121*b*.

The light incident between the first sidewall 111 and the second sidewall 112 is totally reflected after impinging onto the fourth sidewall 122*a*, with the propagation direction changed to a direction toward the third sidewall 121*a*. After reaching the third sidewall 121*a*, the light is totally reflected at the third sidewall 121*a*, with the propagation direction changed to a direction the same as the direction of the third sidewall 121*b*.

The light reflected by the third sidewall and the fourth sidewall is adjusted to a propagation direction parallel to the fourth sidewall, so that the light can smoothly propagate in the waveguide core, and the light propagation efficiency is improved.

In some optional implementations, the second waveguide segment includes a plurality of third sidewalls and a plurality of fourth sidewalls. In the specific implementation shown in FIGS. 6 and 8, the second waveguide segment 120 includes two third sidewalls 121 (a third sidewall 121*a* and a third sidewall 121*b*, respectively, where the third sidewall 121*a* is connected to the first sidewall 111) and three fourth sidewalls (a fourth sidewall 122*a*, a fourth sidewall 122*b* and a fourth sidewall 122*c*, respectively, where the fourth sidewall 122*a* is connected to the second sidewall 112).

As shown in FIGS. 6 and 8, the third sidewall 121*b* away from the first sidewall 111 is parallel to the fourth sidewall 122*c* farthest from the second sidewall 112, and the third sidewall 121*b* away from the first sidewall 111 is parallel to the fourth sidewall 122*a* connected to the second sidewall 112.

As shown in FIGS. 7 and 9, the light incident along the first sidewall 111 is totally reflected at a boundary of a fourth sidewall 122*a* and a fourth sidewall 122*b*, with the propagation direction of light changed to a direction of propagating toward the third sidewall 121*a*. After reaching the third sidewall 121*a*, the light is totally reflected at the third sidewall 121*a*, with the propagation direction of light changed to a direction of propagating along the third sidewall 121*b* parallel to the fourth sidewall 122*a* and the fourth sidewall 122*c*.

The light incident along the second sidewall 112 is totally reflected at an intersection of the second sidewall 112 and the fourth sidewall 122*a*, with the propagation direction of light changed to a direction of propagating toward the third sidewall 121*a*. After reaching the third sidewall 121*a*, the light is totally reflected at the third sidewall 121*a*, with the propagation direction of light changed to a direction parallel to the fourth sidewall 122*a* and the fourth sidewall 122*c*.

After the light incident between the first sidewall 111 and the second sidewall 112 impinges onto the fourth sidewall 122*a*, the light is totally reflected at the fourth sidewall 122*a*, with the propagation direction changed to a direction of propagating toward the third sidewall. After reaching the third sidewall 121*a*, the light is totally reflected at the third sidewall 121*a*, with the propagation direction of light changed to a direction parallel to the fourth sidewall 122*a* and the fourth sidewall 122*c*. The difference between the implementation shown in FIG. 6 and the implementation shown in FIG. 8 lies in that in FIG. 6, a position where the third sidewall begins to deflect with respected to the first sidewall may be after a position where the fourth sidewall begins to deflect from the second sidewall, while in the implementation shown in FIG. 8, the position where the third sidewall begins to deflect with respected to the first sidewall is before the position where the fourth sidewall begins to deflect from the second sidewall.

According to the total reflection characteristics, when the optical signal is totally reflected, the propagation direction of light is deflected by an angle of 2 times A1 with respect to the propagation direction before the total reflection, and to ensure that light is totally reflected upon reaching the fourth sidewall 122*b*, optionally, an angle of rotation of a middle one 122*b* of the three fourth sidewalls in the first direction with respect to the second sidewall 112 is not greater than twice an angle of rotation of the fourth sidewall 122*a* connected to the second sidewall 112 in the first direction with respect to the second sidewall.

In the present disclosure, the number of the first and second waveguide segments in the waveguide core is not particularly limited. Apparently, it is also possible to include more than just the first and second waveguide segments in the waveguide core. The specific structure of the waveguide core may be determined according to a length of the waveguide core. Later cases are not particularly limited. As an optional implementation, the waveguide core further includes a plurality of second waveguide segments, and a plurality of first waveguide segments connected to the second waveguide segments. Further, the plurality of sidewalls of the waveguide core may further include at least one fifth sidewall and at least one sixth sidewall. The at least one fifth sidewall and the at least one sixth sidewall are in one-to-one correspondence and disposed oppositely to define third waveguide segments, one end of the third waveguide segment is connected to the second waveguide segment, the other end of the third waveguide segment is connected to the first waveguide segment. Two ends of the fifth sidewall are respectively connected to the corresponding third sidewall and first sidewall, two ends of the sixth sidewall are respectively connected to the corresponding fourth sidewall and second sidewall, and the sixth sidewall is coplanar with the sidewall connected to the sixth sidewall. Moreover, for a non-last third waveguide segment, the fifth sidewall is coplanar with the first sidewall connected to the fifth sidewall.

For one waveguide core, there are two cases: in a first case, one of the first waveguide segments is located at one end of the waveguide core, and one of the second waveguide segments is located at the other end of the waveguide core; and in a second case, one of the first waveguide segments is located at one end of the waveguide core, and one of the third waveguide segments is located at the other end of the waveguide core.

For a third waveguide segment in a middle part the waveguide core: one end of the third waveguide segment is connected to a second waveguide segment adjacent to the third waveguide segment, the other end of the third waveguide segment is connected to a first waveguide segment adjacent to the third waveguide segment: two ends of the fifth sidewall are respectively connected to the corresponding third sidewall and first sidewall, two ends of the sixth sidewall are respectively connected to the corresponding fourth sidewall and second sidewall, and the fifth sidewall is coplanar with the first sidewall connected to the fifth sidewall, and the sixth sidewall is coplanar with the fourth sidewall connected to the sixth sidewall.

For a third waveguide segment at an end of the waveguide core: one end of the third waveguide segment is connected to a second waveguide segment adjacent to the third waveguide segment, one end of the fifth sidewall is connected to the corresponding third sidewall, one end of the sixth sidewall is connected to the corresponding fourth sidewall, and the sixth sidewall is coplanar with the fourth sidewall connected to the sixth sidewall.

Since the fifth sidewall and the sixth sidewall are parallel to each other, the sixth sidewall is coplanar with the fourth sidewall connected to the sixth sidewall, and the light emitted from the second waveguide segment is in a direction parallel to the fourth sidewall, the light emitted from the second waveguide segment can propagate in the third waveguide segment in a direction parallel to the fifth sidewall and the sixth sidewall without exiting the third waveguide segment.

By arranging the third waveguide segments in the above manner (i.e., two adjacent third waveguide segments are connected to each other via the first waveguide segment and the second waveguide segment), the following relative positional relationship between the one end port of the waveguide core and the other end port of the waveguide core in the optical-electronic printed circuit board may be achieved: an angle exists between the one end port of the waveguide core and the other end port of the waveguide core in the optical-electronic printed circuit board.

In some optional implementations, as shown in FIG. 10, the waveguide core includes a plurality of third waveguide segments, and the parameters of the waveguide core further include an angle of rotation of the sixth sidewall in a latter one of two adjacent third waveguide segments with respect to the sixth sidewall in a former one of the third waveguide segments. Further, the angle of rotation of the sixth sidewall in the latter one of two adjacent third waveguide segments with respect to the sixth sidewall in the former one of the third waveguide segments satisfies the following relational expressions (5) to (6):

$$0<a_i<(90°-\alpha) \quad (5);\text{ and}$$

$$0<a_1<(90°-\alpha) \quad (6);$$

where i is a serial number of a third waveguide segment, i is a natural number, and 2≤i≤N; where N is a natural number greater than 2, and in a direction from the one end port of the waveguide core to the other end port of the waveguide core in the optical-electronic printed circuit board, the third waveguide segments, the first waveguide segments, and the second waveguide segments are sequentially numbered, respectively;

$a_i$ is an angle of rotation of the sixth sidewall in the $i^{th}$ third waveguide segment in a first direction with respect to the sixth sidewall in the $(i-1)^{th}$ third waveguide segment; and $a_1$ is an angle of rotation of the sixth sidewall in a $1^{st}$ third waveguide segment in the first direction with respect to the second sidewall in a $1^{st}$ first waveguide segment.

FIG. 11 is a diagram showing a connection relationship between the $(i-1)^{th}$ third waveguide segment and the $i^{th}$ third waveguide segment. As shown in FIG. 11, a sixth sidewall 161 in the $(i-1)^{th}$ third waveguide segment is connected to and coplanar with the second sidewall 112, and a fifth sidewall 151 in the $(i-1)^{th}$ third waveguide segment is connected to and coplanar with the first sidewall 111; and the sixth sidewall 161 in the $(i-1)^{th}$ third waveguide segment is connected to and coplanar with the fourth sidewall 122*c*.

In FIG. 11, the corner structure (which includes the first waveguide segment and the second waveguide segment) connecting the $(i-1)^{th}$ third waveguide segment and the $i^{th}$ third waveguide segment is the structure having the first waveguide segment and the second waveguide segment shown in FIG. 7, but the present disclosure is not limited thereto, and the specific shape of the corner structure connecting two adjacent third waveguide segments may be determined according to an angle between the sixth sidewalls in the two adjacent third waveguide segments.

It should be noted that for the sidewalls of two adjacent third waveguide segments, the sidewalls of a latter third waveguide segment are deflected in the first direction with respect to the sidewalls of a former third waveguide segment. That is, a plurality of fifth sidewalls have the same deflection trend, and accordingly, a plurality of sixth sidewalls also have the same deflection trend. In the implementation shown in FIG. a latter one of two adjacent sidewalls is deflected counterclockwise from a former one. In the implementation shown in FIG. 10, an angle of 90° exists between the one end port of the waveguide core and the other end port of the waveguide core. Further, N is 6, and $0<a_1, a_2, a_3, a_4, a_5, a_6<90°-\alpha$.

In the implementation shown in FIG. 12, the second direction is the vertical direction. A vertical (second direction) distance exists between Port 1 corresponding to the first waveguide segment and Port 2 corresponding to the second waveguide segment. A first waveguide segment and a third waveguide segment are respectively located at two end ports of the optical-electronic printed circuit board and are parallel to each other, and the second direction is perpendicular to an extending direction of a $1^{st}$ first waveguide segment.

In the implementation shown in FIG. 12, the plurality of sidewalls of the waveguide core further include at least one fifth sidewall and at least one sixth sidewall in one-to-one correspondence and disposed oppositely to define third waveguide segments, the waveguide core includes K third waveguide segments, the fifth sidewalls are located on one side of a center line of the waveguide core, and the sixth sidewall is located on the other side of the center line of the waveguide core. The fifth sidewall is coplanar with the sidewall connected to the fifth sidewall, and the sixth sidewall is coplanar with the sidewall connected to the sixth sidewall.

For each of first M third waveguide segments: one end of the third waveguide segment is connected to the second waveguide segment, the other end of the third waveguide segment is connected to the first waveguide segment, and the first sidewall and the third sidewall are both located on a same side of the center line as the fifth sidewall.

For each of the $(M+1)^{th}$ to the $k^{th}$ third waveguide segments: one end of the third waveguide segment is connected to the second waveguide segment, the other end of the third waveguide segment is connected to the first waveguide segment, and the first sidewall and the third sidewall are both located on a same side of the center line as the sixth sidewall.

In two adjacent third waveguide segments, the sixth sidewall in a latter one of the two adjacent third waveguide segments is rotated at an angle of rotation with respect to the sixth sidewall in a former one of the two adjacent third waveguide segments, and the angle of rotation of the sixth sidewall in the latter one of the two adjacent third waveguide segments with respect to the sixth sidewall in the former one of the two adjacent third waveguide segments satisfies the following relational expressions (7) to (9):

$$0<c_j<(90°-\alpha), 1\leq j\leq M \quad (7);$$

$$0<c_l<(90°-\alpha), M\leq l<K \quad (8); \text{ and}$$

$$0<c_1<(90°-\alpha) \quad (9);$$

where j and l are both serial numbers of third waveguide segments, and in a direction from the one end port of the waveguide core to the other end port of the waveguide core in the optical-electronic printed circuit board, the third waveguide segments, the first waveguide segments, and the second waveguide segments are sequentially numbered, respectively;

$c_j$ is an angle of rotation of the sixth sidewall in an $j^{th}$ third waveguide segment in a first direction with respect to the sixth sidewall in an $(j-1)^{th}$ third waveguide segment;

$c_l$ is an angle of rotation of the sixth sidewall in an $l^{th}$ third waveguide segment in a third direction with respect to a sidewall in a previous third waveguide segment adjacent to the $l^{th}$ third waveguide segment on a same side of the center line as the sixth sidewall in the $l^{th}$ third waveguide segment, where M<K, and M and K are both natural numbers, and one of the first direction and the third direction is clockwise, while the other one is counterclockwise; and $c_1$ is an angle of rotation of the sixth sidewall in a $1^{st}$ third waveguide segment in the first direction with respect to the second sidewall in a $1^{st}$ first waveguide segment.

In the implementation shown in FIG. 12, K is 5, M is 3, and $0<c_1, c_2, c_3, c_4, c_5<(90°-\alpha)$.

In the present disclosure, the number of waveguide cores in the optical-electronic printed circuit board is not particularly limited, and optionally, the optical-electronic printed circuit board includes a plurality of waveguide cores.

In the present disclosure, the arrangement of the plurality of waveguide cores in the base layer is not particularly limited, and optionally, as shown in FIGS. 10 and 12, center lines of the plurality of waveguide cores are parallel to each other.

As a third aspect of the present disclosure, there is provided an electronic device, including:

one or more processors;

a storage means having one or more programs stored thereon which, when executed by the one or more processors, cause the one or more processors to implement the method for determining parameters of the present disclosure as described above; and one or more I/O interfaces connected between the one or more processors and the storage means and configured to enable information interaction between the one or more processors and the storage means.

The processor is a device with a data processing capability, including but not limited to, a central processing unit (CPU), or the like; the storage means is a device with a data storage capability including but not limited to, a random access memory (RAM, more specifically SDRAM, DDR, etc.), a read only memory (ROM), an electrically erasable programmable read-only memory (EEPROM) or a flash memory (FLASH); and the I/O interface (read/write interface) is connected between the processor 101 and the memory to implement information interaction between the processor and the storage means, and includes, but is not limited to, a bus or the like.

In some embodiments, the processor, the storage means, and the I/O interface are interconnected via a bus, and further connected to other components of a computing device.

As a fourth aspect of the present disclosure, there is provided a non-transitory computer-readable storage medium storing a computer program thereon which, when executed by a processor, causes the method for determining parameters of the present disclosure as described above to be implemented.

Those of ordinary skill in the art will appreciate that all or some operations of the above described method, functional modules/units in the system and apparatus may be implemented as software, firmware, hardware, and suitable combinations thereof. In a hardware implementation, the division between the functional modules/units mentioned in the above description does not necessarily correspond to the division of physical components; for example, one physical component may have multiple functions, or one function or operation may be performed cooperatively by several physical components. Some or all physical components may be implemented as software executed by a processor, such as a CPU, a digital signal processor or microprocessor, or implemented as hardware, or implemented as an integrated circuit, such as an application specific integrated circuit. Such software may be distributed on a computer-readable storage medium which may include a computer storage medium (or non-transitory medium) or a communication medium (or transitory medium). As is well known to those of ordinary skill in the art, the term computer storage medium includes volatile and nonvolatile, removable and non-removable medium implemented in any method or technology for storing information, such as computer-readable instructions, data structures, program modules or other data. The computer storage medium includes, but is not limited to, an RAM, an ROM, an EEPROM, a flash or any other memory technology, a CD-ROM, a digital versatile disc (DVD) or any other optical disc storage, a magnetic cartridge, a magnetic tape, a magnetic disk storage or any other magnetic storage device, or may be any other medium used for storing the desired information and accessible by a computer. Moreover, it is well known to those ordinary skilled in the art that a communication medium typically includes a computer-readable instruction, a data structure, a program module, or other data in a modulated data signal, such as a carrier wave or other transport mechanism, and may include any information delivery medium.

The present disclosure has disclosed exemplary embodiments, and although specific terms are employed, they are used and should be interpreted merely in a generic and descriptive sense, not for purposes of limitation. In some instances, as would be apparent to one skilled in the art, features, characteristics and/or elements described in connection with a particular embodiment may be used alone or in combination with features, characteristics and/or elements described in connection with another embodiment, unless expressly stated otherwise. It will, therefore, be understood by those skilled in the art that various changes in form and details may be made therein without departing from the scope of the present disclosure as set forth in the appended claims.

What is claimed is:

1. A method for determining parameters of a waveguide core in an optical-electronic printed circuit board, wherein the waveguide core comprises a plurality of sidewalls which define a first waveguide segment and a second waveguide segment connected to the first waveguide segment;

the plurality of sidewalls comprise a first sidewall and a second sidewall disposed opposed to each other in the first waveguide segment, and the first sidewall is parallel to the second sidewall;

the plurality of sidewalls further comprise at least one third sidewall and at least one fourth sidewall in the second waveguide segment, the first sidewall is adjacent to and intersects one of the at least one third sidewall, the second sidewall is adjacent to and intersects one of the at least one fourth sidewall, the first sidewall and the at least one third sidewall are located on a same side, and the second sidewall and the at least one fourth sidewall are located on a same side, and the method comprises:

determining, according to a refractive index of a material from which the waveguide core is made and a refractive index of a material from which a base layer is made, a critical angle of total reflection at an interface between the waveguide core and the base layer; and determining the parameters of the waveguide core according to a relative positional relationship between one end port of the waveguide core and the other end port of the waveguide core in the optical-electronic printed circuit board, a condition of a region through which the waveguide core passes, and the critical angle, so that an incident angle of light transmitted through the first waveguide segment and impinging on any one of the at least one third sidewall of the waveguide core is not less than the critical angle, and an incident angle of light impinging on any one of the at least one fourth sidewall of the waveguide core is not less than the critical angle, wherein the parameters of the waveguide core comprise the number of the at least one third sidewalls, the number of the at least one fourth sidewalls, an angle of rotation of each fourth sidewall with respect to a previous sidewall connected thereto, and an angle of rotation of each third sidewall with respect to a previous sidewall connected thereto.

2. The method according to claim 1, wherein the first sidewall is parallel to the second sidewall, and wherein the at least one third sidewall and the at least one fourth sidewall satisfy:

$$0<A1\leq(90°-\alpha); \text{ and}$$

$$A2\geq A1;$$

where

A1 is an angle of rotation of the fourth sidewall intersecting the second sidewall with respect to the second sidewall;

A2 is an angle of rotation of the third sidewall intersecting the first sidewall with respect to the first sidewall; and α is a critical angle of total reflection of light at the interface between the waveguide core and the base layer.

3. The method according to claim 2, wherein the second waveguide segment comprises a plurality of third sidewalls and one fourth sidewall, and an angle of rotation of a latter one of any two adjacent third sidewalls with respect to the first sidewall is smaller than an angle of rotation of a former one of the third sidewalls with respect to the first sidewall.

4. The method according to claim 2, wherein the second waveguide segment comprises a plurality of fourth sidewalls, and wherein the at least one third sidewall and the at least one fourth sidewall further satisfy:

$$A1\leq A3\leq 2A1,$$

where A3 is an angle of rotation of other fourth sidewalls with respect to the second sidewall except the fourth sidewall intersecting the second sidewall.

5. The method according to claim 2, wherein the waveguide core comprises a plurality of waveguide segment groups, each consisting of one first waveguide segment and one second waveguide segment connected together, the plurality of sidewalls of the waveguide core further comprise a plurality of fifth sidewalls and a plurality of sixth sidewalls in one-to-one correspondence and disposed oppositely to define a plurality of third waveguide segments, the first waveguide segment of one of the plurality of waveguide segment groups is located at one end of the waveguide core, and one of the plurality of third waveguide segments is located at the other end of the waveguide core;

for a third waveguide segment in a middle part of the waveguide core: one end of the third waveguide segment is connected to a second waveguide segment of a waveguide segment group adjacent to the one end of the third waveguide segment, the other end of the third waveguide segment is connected to a first waveguide segment of another waveguide segment group adjacent to the other end of the third waveguide segment, two ends of the fifth sidewall are respectively connected to the corresponding third sidewall and first sidewall, two ends of the sixth sidewall are respectively connected to the corresponding fourth sidewall and second sidewall, the fifth sidewall is coplanar with the first sidewall connected to the fifth sidewall, and the sixth sidewall is coplanar with the fourth sidewall connected to the sixth sidewall; and for the third waveguide segment at the other end of the waveguide core: one end of the third waveguide segment is connected to a second waveguide segment of a waveguide segment group adjacent to the one end of the third waveguide segment, one end of the fifth sidewall is connected to the corresponding third sidewall, one end of the sixth sidewall is connected to the corresponding fourth sidewall, and the sixth sidewall is coplanar with the fourth sidewall connected to the sixth sidewall.

6. The method according to claim 5, wherein the relative positional relationship between the one end port of the waveguide core and the other end port of the waveguide core in the optical-electronic printed circuit board comprises that: an angle exists between one end port of the waveguide core and the other end port of the waveguide core in the optical-electronic printed circuit board;

the parameters of the waveguide core further comprise an angle of rotation of the sixth sidewall in a latter one of two adjacent third waveguide segments with respect to the sixth sidewall in a former one of the third waveguide segments, and the angle of rotation satisfies:

$$0<a_i<(90°-\alpha); \text{ and}$$

$$0<a_1<(90°-\alpha);$$

where i is a serial number of a third waveguide segment, i is a natural number, and 2≤i≤N, where N is a natural number greater than 2, and in a direction from the one end port of the waveguide core to the other end port of the waveguide core in the optical-electronic printed circuit board, the third waveguide segments, the first waveguide segments and the second waveguide segments are sequentially numbered, respectively;

$a_i$ is an angle of rotation of the sixth sidewall in an $i^{th}$ third waveguide segment in a first direction with respect to the sixth sidewall in an $(i-1)^{th}$ third waveguide segment; and $a_i$ is an angle of rotation of the sixth sidewall in a $1^{st}$ third waveguide segment in the first direction with respect to the second sidewall in a $1^{st}$ first waveguide segment.

7. The method according to claim 2, wherein, the waveguide core comprises a plurality of waveguide segment groups, each consisting of one first waveguide segment and one second waveguide segment connected together, the plurality of sidewalls of the waveguide core further comprise a plurality of fifth sidewalls and a plurality of sixth sidewalls in one-to-one correspondence and disposed oppositely to define K third waveguide segments, the first waveguide segment of one of the plurality of waveguide segment groups is located at one end port of the optical-electronic printed circuit board, one of the third waveguide segments is located at the other end port of the optical-electronic printed circuit board, and the first waveguide segment located at the one end port of the optical-electronic printed circuit board and the third waveguide segment located at the other end port of the optical-electronic printed circuit board are parallel to each other, and the relative positional relationship between the one end port of the waveguide core and the other end port of the waveguide core in the optical-electronic printed circuit board comprises that: a distance along a second direction exists between the one end port of the waveguide core and the other end port of the waveguide core in the optical-electronic printed circuit board, and the second direction is perpendicular to an extending direction of a $1^{st}$ first waveguide segment;

the fifth sidewalls are located on one side of a center line of the waveguide core, the sixth sidewalls are located on the other side of the center line of the waveguide core, the fifth sidewalls are coplanar with sidewalls connected to the fifth sidewalls, and the sixth sidewalls are coplanar with sidewalls connected to the sixth sidewalls;

for each of first M third waveguide segments: one end of the third waveguide segment is connected to a second waveguide segment of a waveguide segment group adjacent to the one end of the third waveguide segment, the other end of the third waveguide segment is connected to a first waveguide segment of another waveguide segment group adjacent to the other end of the third waveguide segment, and the first sidewall of the first waveguide segment and the third sidewall of the second waveguide segment are both located on a same side of the center line as the fifth sidewalls;

for each of $(M+1)^{th}$ to $k^{th}$ third waveguide segments: one end of the third waveguide segment is connected to a second waveguide segment of a waveguide segment group adjacent to the one end of the third waveguide segment, the other end of the third waveguide segment is connected to a first waveguide segment of another waveguide segment group adjacent to the other end of the third waveguide segment, and the first sidewall of the first waveguide segment and the third sidewall of the second waveguide segment are both located on a same side of the center line as the sixth sidewalls; and the sixth sidewall in a latter one of two adjacent third waveguide segments is rotated at an angle of rotation with respect to the sixth sidewall in a former one of the two adjacent third waveguide segments, and the angle of rotation of the sixth sidewall in the latter one of the two adjacent third waveguide segments with respect to the sixth sidewall in the former one of the third waveguide segments satisfies:

$$0<c_j<(90°-\alpha), 2\leq j\leq M;$$

$$0<c_l<(90°-\alpha), M\leq l<K; \text{ and}$$

$$0<c_1<(90°-\alpha);$$

where j and l are both serial numbers of third waveguide segments, and in a direction from the one end port of the waveguide core to the other end port of the waveguide core in the optical-electronic printed circuit board, the third waveguide segments, the first waveguide segments, and the second waveguide segments are sequentially numbered;

$c_j$ is an angle of rotation of the sixth sidewall in an $j^{th}$ third waveguide segment in a first direction with respect to the sixth sidewall in an $(j-1)^{th}$ third waveguide segment;

$c_l$ is an angle of rotation of the sixth sidewall in an $l^{th}$ third waveguide segment in a third direction with respect to a sidewall in a previous third waveguide segment adjacent to the $l^{th}$ third waveguide segment on a same side of the center line as the sixth sidewall in the $l^{th}$ third waveguide segment, where M<K, and M and K are both natural numbers, and one of the first direction and the third direction is clockwise, while the other one is counterclockwise; and $c_1$ is an angle of rotation of the sixth sidewall in a $1^{st}$ third waveguide segment in the first direction with respect to the second sidewall in a $1^{st}$ first waveguide segment.

8. The method according to claim 1, wherein the condition of the region through which the waveguide core passes is that at least one of a via hole, an electronic component or a wire exists in the region.

9. An optical-electronic printed circuit board, comprising a waveguide layer, the waveguide layer comprising a base layer and at least one waveguide core in the base layer, wherein the waveguide core comprises a plurality of sidewalls which define a first waveguide segment and a second waveguide segment connected to the first waveguide segment;

the plurality of sidewalls comprise a first sidewall and a second sidewall disposed opposed to each other in the first waveguide segment, and the first sidewall is parallel to the second sidewall;

the plurality of sidewalls further comprise at least one third sidewall and at least one fourth sidewall in the second waveguide segment, the first sidewall is adjacent to and intersects one of the at least one third sidewall, the second sidewall is adjacent to and intersects one of the at least one fourth sidewall, the first sidewall and the at least one third sidewall are located on a same side, and the second sidewall and the at least one fourth sidewall are located on a same side; and parameters of the waveguide core are configured such that an incident angle of light transmitted through the first waveguide segment and impinging on any one of the at least one third sidewall of the waveguide core is not less than a critical angle of total reflection at an interface between the waveguide core and the base layer, and an incident angle of light impinging on any one of the at least one fourth sidewall of the waveguide core is not less than the critical angle, wherein the parameters of the waveguide core comprise the number of the third sidewalls, the number of the fourth sidewalls, an angle of rotation of each fourth sidewall with respect to a previous sidewall connected thereto, and an angle of rotation of each third sidewall with respect to a previous sidewall connected thereto.

10. The optical-electronic printed circuit board according to claim 9, wherein the first sidewall is parallel to the second sidewall, and wherein the at least one third sidewall and the at least one fourth sidewall satisfy:

$$0<A1\leq(90°-\alpha); \text{ and}$$

$$A2\geq A1,$$

where

A1 is an angle of rotation of the fourth sidewall intersecting the second sidewall with respect to the second sidewall;

A2 is an angle of rotation of the third sidewall intersecting the first sidewall with respect to the first sidewall; and α is a critical angle of total reflection of light at the interface between the waveguide core and the base layer.

11. The optical-electronic printed circuit board according to claim 10, wherein the second waveguide segment comprises a plurality of third sidewalls and one fourth sidewall, and an angle of rotation of a latter one of any two adjacent third sidewalls with respect to the first sidewall is smaller than an angle of rotation of a former one of the third sidewalls with respect to the first sidewall.

12. The optical-electronic printed circuit board according to claim 10, wherein the second waveguide segment comprises a plurality of fourth sidewalls, and wherein the at least one third sidewall and the at least one fourth sidewall further satisfy:

A1≤A3≤2A1, where A3 is an angle of rotation of other fourth sidewalls with respect to the second sidewall except the fourth sidewall intersecting the second sidewall.

13. The optical-electronic printed circuit board according to claim 9, wherein the waveguide core comprises a plurality of waveguide segment groups, each consisting of one first waveguide segment and one second waveguide segment connected together, the plurality of sidewalls of the waveguide core further comprise a plurality of fifth sidewalls and a plurality of sixth sidewalls in one-to-one correspondence and disposed oppositely to define a plurality of third waveguide segments, the first waveguide segment of one of the plurality of waveguide segment groups is located at one end of the waveguide core, and one of the plurality of third waveguide segments is located at the other end of the waveguide core;

for a third waveguide segment in a middle part of the waveguide core: one end of the third waveguide segment is connected to a second waveguide segment of a waveguide segment group adjacent to the one end of the third waveguide segment, the other end of the third waveguide segment is connected to a first waveguide segment of another waveguide segment group adjacent to the other end of the third waveguide segment, two ends of the fifth sidewall are respectively connected to the corresponding third sidewall and first sidewall, two ends of the sixth sidewall are respectively connected to the corresponding fourth sidewall and second sidewall, the fifth sidewall is coplanar with the first sidewall connected to the fifth sidewall, and the sixth sidewall is coplanar with the fourth sidewall connected to the sixth sidewall; and for the third waveguide segment at the other end of the waveguide core: one end of the third waveguide segment is connected to a second waveguide segment of a waveguide segment group adjacent to the one end of the third waveguide segment, one end of the fifth sidewall is connected to the corresponding third sidewall, one end of the sixth sidewall is connected to the corresponding fourth sidewall, and the sixth sidewall is coplanar with the fourth sidewall connected to the sixth sidewall.

14. The optical-electronic printed circuit board according to claim 13, wherein an angle exists between the one end port of the waveguide core and the other end port of the waveguide core in the optical-electronic printed circuit board; and the parameters of the waveguide core further comprise an angle of rotation of the sixth sidewall in a latter one of two adjacent third waveguide segments with respect to the sixth sidewall in a former one of the third waveguide segments, and the angle of rotation satisfies:

$$0<a_i<(90°-\alpha); \text{ and}$$

$$0<a_1<(90°-\alpha);$$

where i is a serial number of a third waveguide segment, i is a natural number, and 2≤i≤N, where N is a natural number greater than 2, and in a direction from the one end port of the waveguide core to the other end port of the waveguide core in the optical-electronic printed circuit board, the third waveguide segments, the first waveguide segments, and the second waveguide segments are sequentially numbered;

where $a_i$ is an angle of rotation of the sixth sidewall in an $i^{th}$ third waveguide segment in a first direction with respect to the sixth sidewall in an $(i-1)^{th}$ third waveguide segment; and $a_1$ is an angle of rotation of the sixth sidewall in a $1^{st}$ third waveguide segment in the first direction with respect to the second sidewall in a $1^{st}$ first waveguide segment.

15. The optical-electronic printed circuit board according to claim 9, wherein, the waveguide core comprises a plurality of waveguide segment groups, each consisting of one first waveguide segment and one second waveguide segment connected together, the plurality of sidewalls of the waveguide core further comprise a plurality of fifth sidewalls and a plurality of sixth sidewalls in one-to-one correspondence and disposed oppositely to define K third waveguide segments, the first waveguide segment of one of the plurality of waveguide segment groups is located at one end port of the optical-electronic printed circuit board, one of the third waveguide segments is located at the other end port of the optical-electronic printed circuit board, and the first waveguide segment located at the one end port of the optical-electronic printed circuit board and the third waveguide segment located at the other end port of the optical-electronic printed circuit board are parallel to each other, and a distance along a second direction exists between the one end port of the waveguide core and the other end port of the waveguide core in the optical-electronic printed circuit board, and the second direction is perpendicular to an extending direction of a $1^{st}$ first waveguide segment;

the fifth sidewalls are located on one side of a center line of the waveguide core, the sixth sidewalls are located on the other side of the center line of the waveguide core, the fifth sidewalls are coplanar with sidewalls connected to the fifth sidewalls, and the sixth sidewalls are coplanar with sidewalls connected to the sixth sidewalls;

for each of first M third waveguide segments: one end of the third waveguide segment is connected to a second waveguide segment of a waveguide segment group adjacent to the one end of the third waveguide segment, the other end of the third waveguide segment is connected to a first waveguide segment of another waveguide segment group adjacent to the other end of the third waveguide segment, and the first sidewall of the first waveguide segment and the third sidewall of the second waveguide segment are both located on a same side of the center line as the fifth sidewalls;

for each of $(M+1)^{th}$ to $k^{th}$ third waveguide segments: one end of the third waveguide segment is connected to a second waveguide segment of a waveguide segment group adjacent to the one end of the third waveguide segment, the other end of the third waveguide segment is connected to a first waveguide segment of another waveguide segment group adjacent to the other end of the third waveguide segment, and the first sidewall of the first waveguide segment and the third sidewall of the second waveguide segment are both located on a same side of the center line as the sixth sidewalls; and the sixth sidewall in a latter one of two adjacent third waveguide segments is rotated at an angle of rotation with respect to the sixth sidewall in a former one of the two adjacent third waveguide segments, and the angle of rotation of the sixth sidewall in the latter one of the two adjacent third waveguide segments with respect to the sixth sidewall in the former one of the third waveguide segments satisfies:

$$0<c_j<(90°-\alpha), 1\leq j\leq M;$$

$$0<c_l<(90°-\alpha), M\leq l<K; \text{ and}$$

$$0<c_1<(90°-\alpha);$$

where j and l are both serial numbers of third waveguide segments, and in a direction from the one end port of the waveguide core to the other end port of the waveguide core in the optical-electronic printed circuit board, the third waveguide segments, the first waveguide segments, and the second waveguide segments are sequentially numbered;

$c_j$ is an angle of rotation of the sixth sidewall in an $j^{th}$ third waveguide segment in a first direction with respect to the sixth sidewall in an $(j-1)^{th}$ third waveguide segment;

$c_l$ is an angle of rotation of the sixth sidewall in an $l^{th}$ third waveguide segment in a third direction with respect to a sidewall in a previous third waveguide segment adjacent to the $l^{th}$ third waveguide segment on a same side of the center line as the sixth sidewall in the $l^{th}$ third waveguide segment, where M<K, and M and K are both natural numbers, and one of the first direction and the third direction is clockwise, while the other one is counterclockwise; and $c_1$ is an angle of rotation of the sixth sidewall in a $1^{st}$ third waveguide segment in the first direction with respect to the second sidewall in a $1^{st}$ first waveguide segment.

16. The optical-electronic printed circuit board according to claim 9, wherein the optical-electronic printed circuit board comprises a plurality of waveguide cores.

17. The optical-electronic printed circuit board according to claim 16, wherein center lines of the plurality of waveguide cores are parallel to each other.

18. The optical-electronic printed circuit board according to claim 9, wherein the optical-electronic printed circuit board further comprises at least one of a via hole, an electronic component or a wire.

19. An electronic device, wherein the electronic device comprises:

one or more processors;

a storage means having one or more programs stored thereon which, when executed by the one or more processors, cause the one or more processors to implement the method according to claim 1; and one or more I/O interfaces connected between the one or more processors and the storage means and configured to enable information interaction between the one or more processors and the storage means.

20. A non-transitory computer-readable storage medium having a computer program stored thereon which, when executed by a processor, causes the method according to claim 1 to be implemented.

* * * * *